(12) United States Patent
Lee

(10) Patent No.: US 7,248,746 B2
(45) Date of Patent: Jul. 24, 2007

(54) DATA DIFFUSION PROCESSING TECHNIQUE

(76) Inventor: Chiou-Haun Lee, P.O. Box 36-80, Taichung City (TW)

( * ) Notice: Subject to any disclaimer, the term of this patent is extended or adjusted under 35 U.S.C. 154(b) by 838 days.

(21) Appl. No.: 10/645,097

(22) Filed: Aug. 21, 2003

(65) Prior Publication Data

US 2005/0041879 A1 Feb. 24, 2005

(51) Int. Cl.
*G06K 9/40* (2006.01)
*G06F 15/00* (2006.01)

(52) U.S. Cl. ........................................ 382/254; 358/1.9

(58) Field of Classification Search ................ 382/254, 382/312; 385/120; 358/1.9, 3.03, 3.05; 430/394
See application file for complete search history.

(56) References Cited

U.S. PATENT DOCUMENTS 5,857,038 A * 1/1999 Owada et al. .............. 382/284
6,381,035 B1 * 4/2002 Zhang et al. ................ 358/1.9
6,638,698 B2 * 10/2003 Chang et al. ............... 430/394
6,999,665 B2 * 2/2006 Veligdan .................... 385/120

* cited by examiner

*Primary Examiner*—Kanjibhai Patel
(74) *Attorney, Agent, or Firm*—Charles E. Baxley

(57) ABSTRACT

A data diffusion processing technique includes the steps of a) dividing a zone into a number of positions and giving a respective default value to each of the positions; and b) assigning one of the positions to be the triggering position and then using the assigned triggering position as the initial position to diffusely transfer data from the triggering position to at least one target position in a diffusion direction, for enabling each of the at least one target position to receive the diffusion data from the triggering position and then to diffusely transfer the diffusion data to at least one next target position after a relation operation of the default value the respective target position with the triggering value of the triggering position to convert the default value of the respective target position into a finished value.

15 Claims, 5 Drawing Sheets

| P1 | P3 | P5 |
|----|----|----|
| 0  | 1  | 0  |
| P2 | P4 | P6 |
| 1  | 1  | 0  |

| P1 | P2 | P3 | P4 | P5 | P6 | Diffusion combination | | |
|---|---|---|---|---|---|---|---|---|
| 0 | 0 | 0 | 0 | 0 | 0 | 1 | 1 | 4 |
| 0 | 0 | 0 | 0 | 0 | 1 | 1 | 2 | 4 |
| 0 | 0 | 0 | 0 | 1 | 0 | 2 | 1 | 3 |
| 0 | 0 | 0 | 0 | 1 | 1 | 1 | 3 | 4 |
| 0 | 0 | 0 | 1 | 0 | 0 | 1 | 1 | 1 |
| 0 | 0 | 0 | 1 | 0 | 1 | 1 |   | 3 |

DATA DIFFUSION PROCESSING TECHNIQUE

BACKGROUND OF THE INVENTION

1. Field of the Invention

The present invention relates to data processing techniques and, more particularly, to a data diffusion processing technique.

2. Description of the Related Art

According to the conventional data processing technique, the control center directly controls every data unit. For example, when processing picture data in a picture zone of 3×3=6 units, the picture variation is controlled by data inputted through X-axis and Y-axis. When updating the picture, the control center inputs data through X-1 and Y-1 to substitute data at the first unit, and then inputs data through X-2 and Y-2 to substitute data at the second unit, and then inputs data through X-3 and Y-3 to substitute data at the third unit, and therefore update of the picture is done.

When updating a motion picture at a screen, the control center needs to uninterruptedly scan and update the value of every unit through X-axis and Y-axis so as to keep the content of the display at the screen continuously changed as desired. Therefore, the control center needs to continuously send a big amount of control commands to every unit and to renew the original value of every unit, keeping the motion picture moving.

Because the control center needs to transmit a big amount of data, a big burden will be given to the control center if the number of units in the picture zone surpasses a certain value, resulting in a picture update delay error. Further, when the conventional data processing technique is applied to the processing of a big scale motion picture in which the distance of every unit is at least several hundred kilometers, different units may receive same data at different times due to different position distances, resulting in a picture update time error and picture processing failure.

SUMMARY OF THE INVENTION

The present invention has been accomplished under the circumstances in view. It is the main object of the present invention to provide a data diffusion processing technique, which causes a variation of data at different positions in a zone by means of a triggering control at assigned triggering positions in the zone without giving a control instruction to every position in the zone as conventional methods did. It is another object of the present invention to provide a data diffusion processing technique, which greatly reduces the amount of control data to be transmitted from the control center. It is still another object of the present invention to provide a data diffusion processing technique, which greatly reduces the time to be used for the transmission of commands from the control center, and accurately controls the time in which the desired variation of the zone is obtained. It is still another object of the present invention to provide a data diffusion processing technique, which eliminates data transfer delay from the control center to the target positions, preventing a picture update time error.

To achieve these and other objects of the present invention, the data diffusion processing technique includes the steps of a) dividing a zone into a number of positions and giving a respective default value to each of the positions; and b) assigning one of the positions to be the triggering position and then using the assigned triggering position as the initial position to diffusely transfer data from the triggering position to at least one target position in a diffusion direction, for enabling each of the at least one target position to receive the diffusion data from the triggering position and then to diffusely transfer the diffusion data to at least one next target position after a relation operation of the default value the respective target position with the triggering value of the triggering position to convert the default value of the respective target position into a finished value.

DETAILED DESCRIPTION OF THE PREFERRED EMBODIMENT

Figure 1:
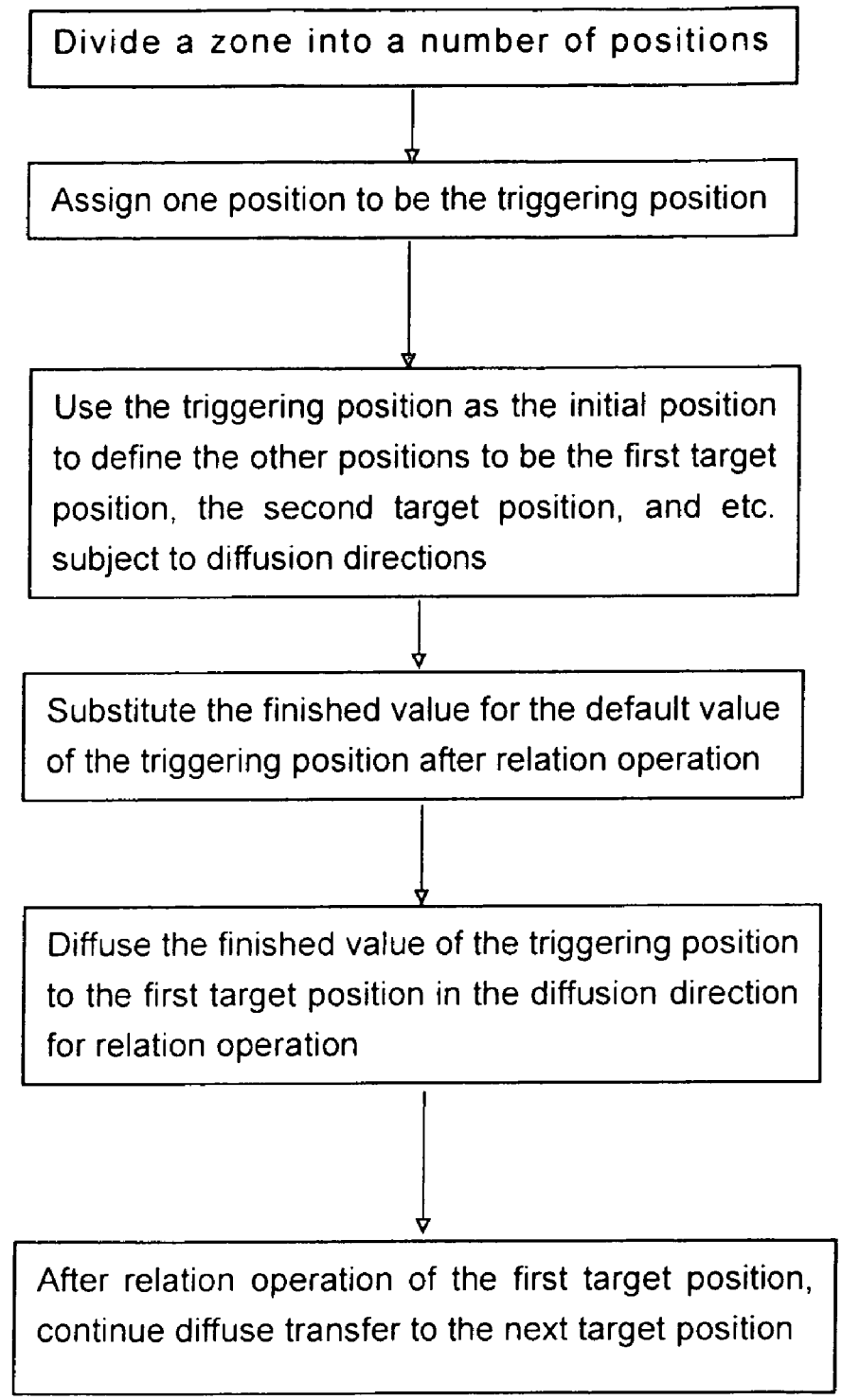
FIG. 1 is a flow chart of the data diffusion technique according to the present invention, explaining the triggering diffusion action.

Referring to FIG. 1, a data diffusion processing technique in accordance with the present invention comprises the step of dividing a zone 10 into a number of positions 11 and giving a respective default value to each position 11, the step of assigning one position 11 to be the triggering position 12 and then using the triggering position 12 as the initial position to diffusely transfer data from the triggering position 12 to a target position 13 in a diffusion direction, for enabling the target position 13 to receive the diffusion data from the antecedent position and then to diffusely transfer the diffusion data to a next target position after a relation operation of the default value thereof with the triggering value of the triggering position. The diffusion data may be diffused horizontally, vertically, or horizontally as well as vertically.

The relation operation can be of EXCLUSIVE OR operation, i.e. the operation result of 0 and 0 is 0, 1 and 1 is 0, 1 and 0 is 1, 0 and 1 is 1.

Figure 2:
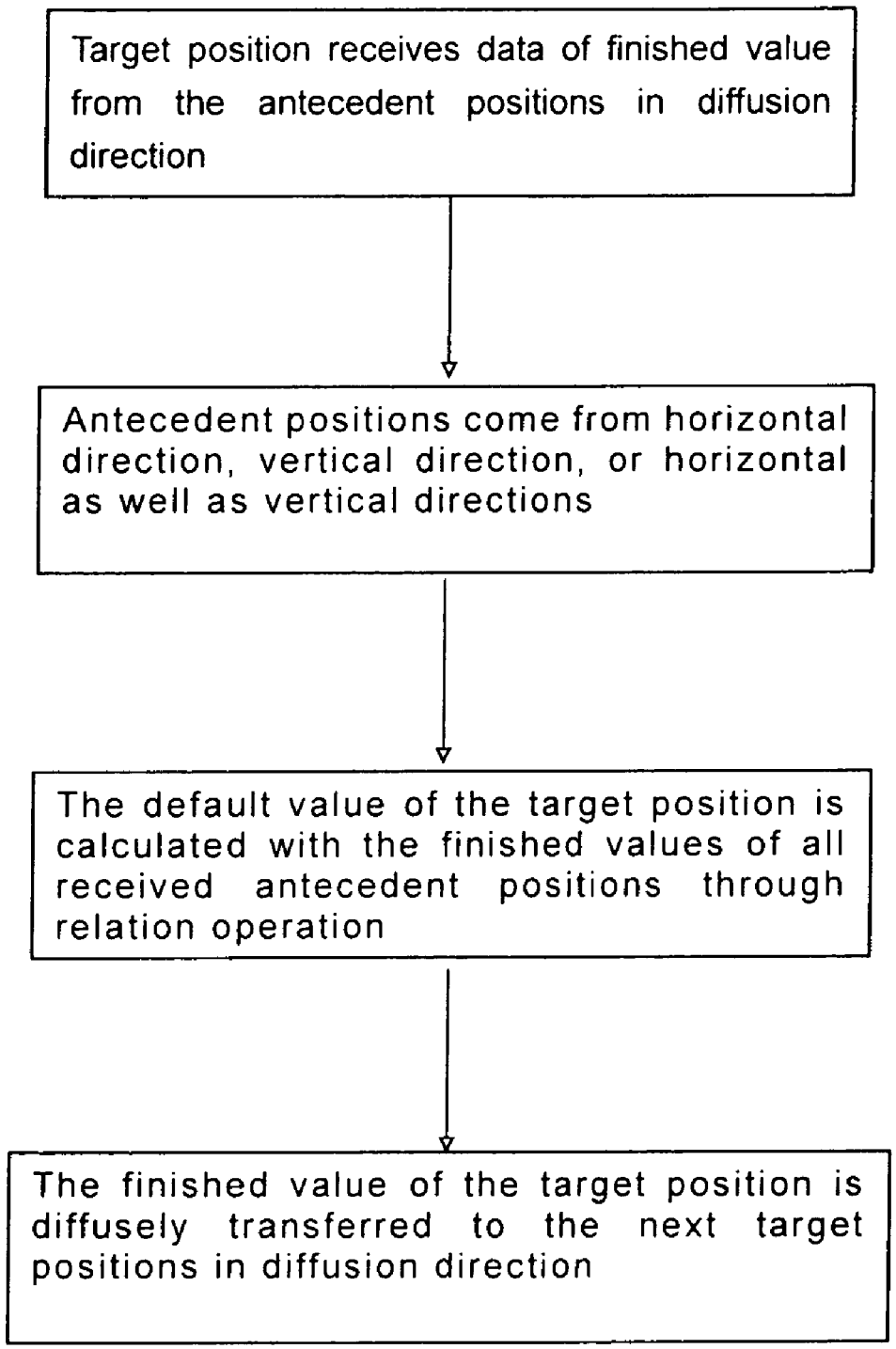
FIG. 2 is a flow chart of the data diffusion technique according to the present invention, explaining triggering diffusion receiving action.

Referring to FIG. 2, the diffusion data to be received by one target position includes the ID code of each antecedent position from which a diffusion data is received. The default value of the target position must be calculated with the diffusion data received from every antecedent position through EXCLUSIVE OR operation to provide a finished value, which is then diffused to at least one next target position horizontally, vertically, or horizontally as well as vertically.

Figures 3A, 3B:
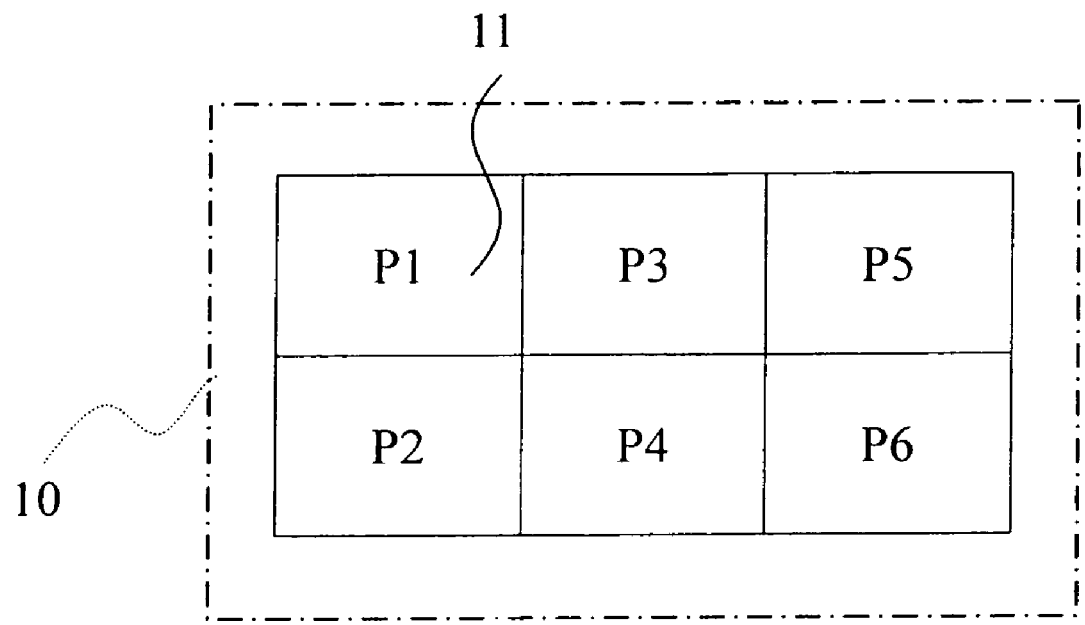
FIG. 3A is a schematic drawing showing a zone divided into a number of positions according to the present invention.
FIG. 3B is a position default value table according to the present invention.
Figures 3C, 3D:
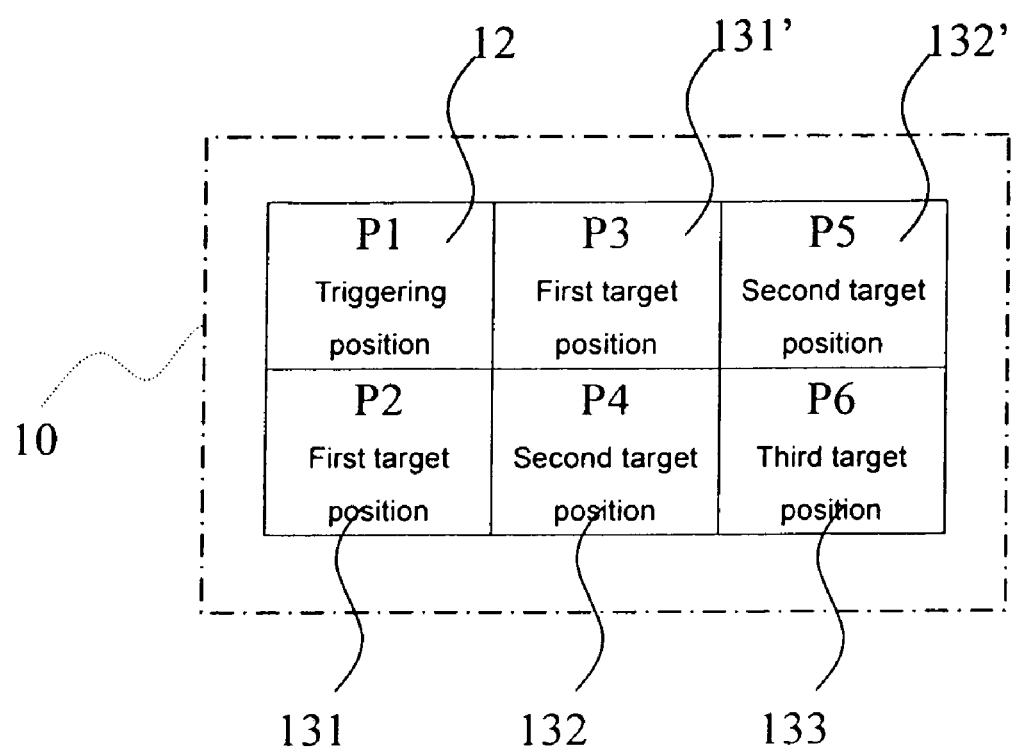
FIG. 3C is a schematic drawing showing the diffusion order among the positions in the zone according to the present invention.
FIG. 3D is a finished value table according to the present invention.

The invention will be fully understood by means of the explanation of the following example. As shown in FIG. 3A, the zone 10 includes 6 positions 11, respectively referenced by P1,P2,P3,P4,P5,P6, and the default value of each position 11 is 1 (see FIG. 3B). Position P1 is assigned to be the triggering position 12. According to the horizontal, vertical, and horizontally and vertically intersected diffusion direction definition, position P2 and position P3 are first target positions 131;131', position P4 and position P5 are second target positions 132;132', position P6 is a third target position 133 (see FIG. 3C).

After EXCLUSIVE OR operation of the default value 1 of the triggering position 12 with the triggering value 1, the finished value of the triggering position P1 (12) is 0. This finished value is then diffusely transferred to the first positions 131;131' in horizontal and vertical directions. After EXCLUSIVE OR operation of the default value 1 of the first target position P2;P3 (131;131') with the finished value 0 of the triggering position P1 (12), the finished value of the first target positions P2;P3 (131;131') is obtained to be 1. The finished value of first target position first target position P2 (131) is diffusely transferred to the second target position P4 (132) in horizontal direction, and the finished value of the first target position P3 (131') is diffusely transferred to the second target position P4 (132) in vertical and the second target position P5 (132') in horizontal.

The second target position P4 (132) receives horizontally diffused data from P2 (131) and vertically diffused data from P3 (131'). Therefore, the default value of second target position P4 (132) must be calculated with the finished value 1 of the first target positions P2;P3 (131;131') through EXCLUSIVE OR operation, i.e. to obtain the finished value 1 for the second target position P4 (132). At the same time, the second target position P5 (132') receives diffusely transferred data from the first target position P3 (131') in horizontal, and the finished value for the second target position P5 (132') is obtained to be 0 after EXCLUSIVE OR operation of the default value 1 of the second target position P5 (132') with the finished value 1 of the first target position P3 (131').

After EXCLUSIVE OR operation of the second target positions P4;P5 (132;132'), the finished value thus obtained is diffusely transferred from the second target position P4 (132) to the third target position P6 (133) in horizontal and from the second target position P5 (132') to the third target position P6 (133) in vertical. The default value 1 of the third target position P6 (133) is calculated with the finished value 1 of the second target position P4 (132) and the finished value 0 of the second target position P5 (132') through EXCLUSIVE OR operation respectively, and therefore the finished value 0 is obtained for the third target position P6 (133).

Therefore, when the default values (1,1,1,1,1,1) of the positions 11 of the zone 10 diffusely processed through the triggering position P1 (12), the result values obtained are (0,1,1,1,0,0) respectively. In the same way; when the default values (1,1,1,1,1,1) of the positions 11 of the zone 10 are diffusely processed through the triggering position P2 (12), the result values obtained are (1,0,1,1,0,0); when the default values (1,1,1,1,1,1) of the positions 11 of the zone 10 are diffusely processed through the triggering position P3 (13), the result values obtained are (1,1,0,1,1,1).

Figures 4, 5:
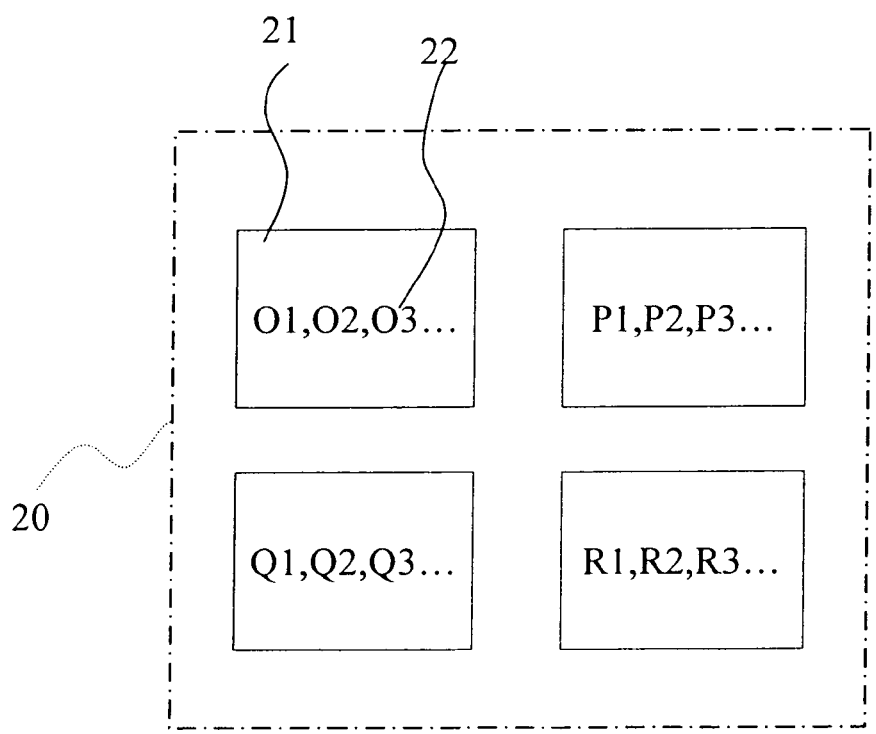
FIG. 4 is a table showing an example of diffusion combination according to the present invention.
FIG. 5 is a schematic drawing showing a zone divided into a number of sub-zones, each sub-zone divided into a number of positions according to the present invention.

By means of triggering different positions 11 and diffusely transferring the data to all positions 11 of the zone 10, the default values of the positions 11 can be changed into one of a number of combinations. Therefore, the user can further use a different triggering point to form a different diffusion combination. As illustrated in FIG. 4, when changing the default values (1,1,1,1,1,1) of the positions of the zone 10 into (0,0,0,0,0,0), the user needs only to trigger P1,P1,P1 and P4 in proper order without transferring varied data to P1~P6. Therefore, when wishing to control zone 10 to produce the desired variation, the user needs only to trigger a part of the positions 11.

FIG. 5 shows an alternate form of the present invention. According to this embodiment, the zone 20 is comprised of a number of sub-zones 21, each sub-zone 21 formed of a number of positions 22. By means of triggering positions 22 of each sub-zone 21, the whole zone 20 is caused to make a diffusion operation, achieving a variation of the whole zone 20.

In comparison with the prior art techniques, the invention provides the following advantages:

a. Unlike the conventional data transferring methods of giving a control instruction to every position, the invention needs only to make a triggering control at triggering positions 12 in the zone 10;20 to cause a variation of the positions 11;22 of the zone 10;20;

b. By means of diffusion transfer among positions 11;22 to change the respective default values, the amount of control data to be transmitted from the control center is greatly reduced;

c. By means of diffusion transfer among positions 11;22, the time in which the desired variation of the whole zone 10;20 is accurately controlled, and the time to be used for the transmission of commands from the control center is greatly reduced.

d. When using the technique of the present invention to process big scale screen motion picture data, data transfer delay from the control center to the positions 11;22 is eliminated, preventing a picture update time error.

What the invention claimed is:

1. A data diffusion processing technique comprising the steps of:
   a) dividing a zone into a number of positions and giving a respective default value to each of said positions;
   b) assigning one of said positions to be the triggering position and then using the assigned triggering position as the initial position to diffusely transfer data from said triggering position to at least one target position in a diffusion direction, for enabling each of said at least one target position to receive the diffusion data from said triggering position and then to diffusely transfer the diffusion data to at least one next target position after a relation operation of the default value the respective target position with the triggering value of said triggering position to convert the default value of the respective target position into a finished value.

2. The data diffusion processing technique as claimed in claim 1, wherein said diffusion data is diffused horizontally.

3. The data diffusion processing technique as claimed in claim 2, wherein when the default value of one said target position converted into a finished value after said relation operation, the finished value is diffused to a next target in horizontal direction.

4. The data diffusion processing technique as claimed in claim 1, wherein said diffusion data is diffused vertically.

5. The data diffusion processing technique as claimed in claim 4, wherein when the default value of one said target position converted into a finished value after said relation operation, the finished value is diffused to a next target in vertical direction.

6. The data diffusion processing technique as claimed in claim 1, herein said diffusion data is diffused horizontally and vertically.

7. The data diffusion processing technique as claimed in claim 6, wherein when the default value of one said target position converted into a finished value after said relation operation, the finished value is simultaneously diffused to one next target in vertical direction and one next target in vertical direction.

8. The data diffusion processing technique as claimed in claim 1, wherein said target position receives relation operation with an antecedent position from horizontal direction.

9. The data diffusion processing technique as claimed in claim 8, wherein the default value of said target position is calculated with the finished value of the antecedent position in horizontal direction through said relation operation.

10. The data diffusion processing technique as claimed in claim 1, wherein said target position receives relation operation with an antecedent position from vertical direction.

11. The data diffusion processing technique as claimed in claim 10, wherein the default value of said target position is calculated with the finished value of the antecedent position in vertical direction through said relation operation.

12. The data diffusion processing technique as claimed in claim 1, wherein said target position receives relation operation with an antecedent position from horizontal direction and an antecedent position from vertical direction.

13. The data diffusion processing technique as claimed in claim 12, wherein the default value of said target position is calculated with the finished value of the antecedent position in horizontal direction and the finished value of the antecedent position in vertical direction through said relation operation.

14. The data diffusion processing technique as claimed in claim 1, wherein said relation operation is EXCLUSIVE OR operation.

15. A data diffusion processing technique comprising the steps of:

a) dividing a zone into a number of sub-zones, and then dividing each of said sub-zones into a number of positions and giving a respective default value to each of said positions;

b) assigning one of said positions to be the triggering position and then using the assigned triggering position as the initial position to diffusely transfer data from said triggering position to at least one target position in a diffusion direction, for enabling each of said at least one target position to receive the diffusion data from said triggering position and then to diffusely transfer the diffusion data to at least one next target position after a relation operation of the default value the respective target position with the triggering value of said triggering position to convert the default value of the respective target position into a finished value.

* * * * *